United States Patent
Kalkunte et al.

(10) Patent No.: US 8,085,766 B2
(45) Date of Patent: Dec. 27, 2011

(54) S-FLOW IN A NETWORK DEVICE

(75) Inventors: Mohan Kalkunte, Sunnyvale, CA (US); John Jeffrey Dull, San Jose, CA (US); Venkateshwar Buduma, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 807 days.

(21) Appl. No.: 11/480,844

(22) Filed: Jul. 6, 2006

(65) Prior Publication Data

US 2007/0008975 A1    Jan. 11, 2007

Related U.S. Application Data

(60) Provisional application No. 60/696,542, filed on Jul. 6, 2005.

(51) Int. Cl.
*H04L 12/56* (2006.01)
(52) U.S. Cl. .................. 370/389; 370/390; 370/392
(58) Field of Classification Search .................. None
See application file for complete search history.

(56) References Cited

U.S. PATENT DOCUMENTS

| | | | |
|---|---|---|---|
| 5,920,568 A * | 7/1999 | Kurita et al. | 370/412 |
| 6,480,471 B1 * | 11/2002 | VanZante et al. | 370/252 |
| 2005/0013300 A1 * | 1/2005 | Akahane et al. | 370/395.3 |
| 2005/0190695 A1 * | 9/2005 | Phaal | 370/229 |
| 2005/0210533 A1 * | 9/2005 | Copeland et al. | 726/23 |
| 2007/0180191 A1 * | 8/2007 | Satoyama et al. | 711/114 |

OTHER PUBLICATIONS

Network Working Group Request for Comments 3176 (RFC 3176), P. Phall, InMon Corportation's sFlow: A Method for Monitoring Traffic in Switched and Routed Networks, The Internet Society, Sep. 2001, pp. 1-31.*

* cited by examiner

*Primary Examiner* — Anthony Sol

(57) ABSTRACT

A network device for providing statistical sampling of packet at a port. The network device includes an ingress module for randomly selecting a packet at one of a plurality of ports for statistical sampling and an egress module for randomly selecting a packet at one of a plurality of ports for statistical sampling. The network device also includes a processing module for receiving a copy of a selected packet from at least one of the ingress module or egress module and for performing statistical flow processing on the packet.

17 Claims, 3 Drawing Sheets

S-FLOW IN A NETWORK DEVICE

BACKGROUND OF THE INVENTION

1. Field of the Invention

The present invention relates to a network device in a data network and more particularly to a system and method of providing support for statistical flow of data by randomly sampling packets at an ingress module and an egress module

2. Description of the Related Art

A packet switched network may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

A current network device may support physical ports and logical/trunk ports, wherein the trunk ports are a set of physical external ports that act as a single link layer port. Ingress and destination ports on the network device may be physical external ports or trunk ports. By logically combining multiple physical ports into a trunk port, the network may provide greater bandwidth for connecting multiple devices. Furthermore, if one port in the trunk fails, information may still be sent between connected devices through other active ports of the trunk. As such, trunk ports also enable the network to provide greater redundancy between connected network devices.

In order to monitor traffic flow between network devices, the network has to statistically monitor packets travelling through the network. There are currently different methods of monitoring traffic flow in the network. For example, packet flows may be monitored at the ingress module or at the egress module of the network. However, these methods may be inaccurate in that some packets monitored at the ingress module may be dropped during processing. Thus, a system is provided to monitor packet flow by randomly sampling packets at the ingress and egress modules.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
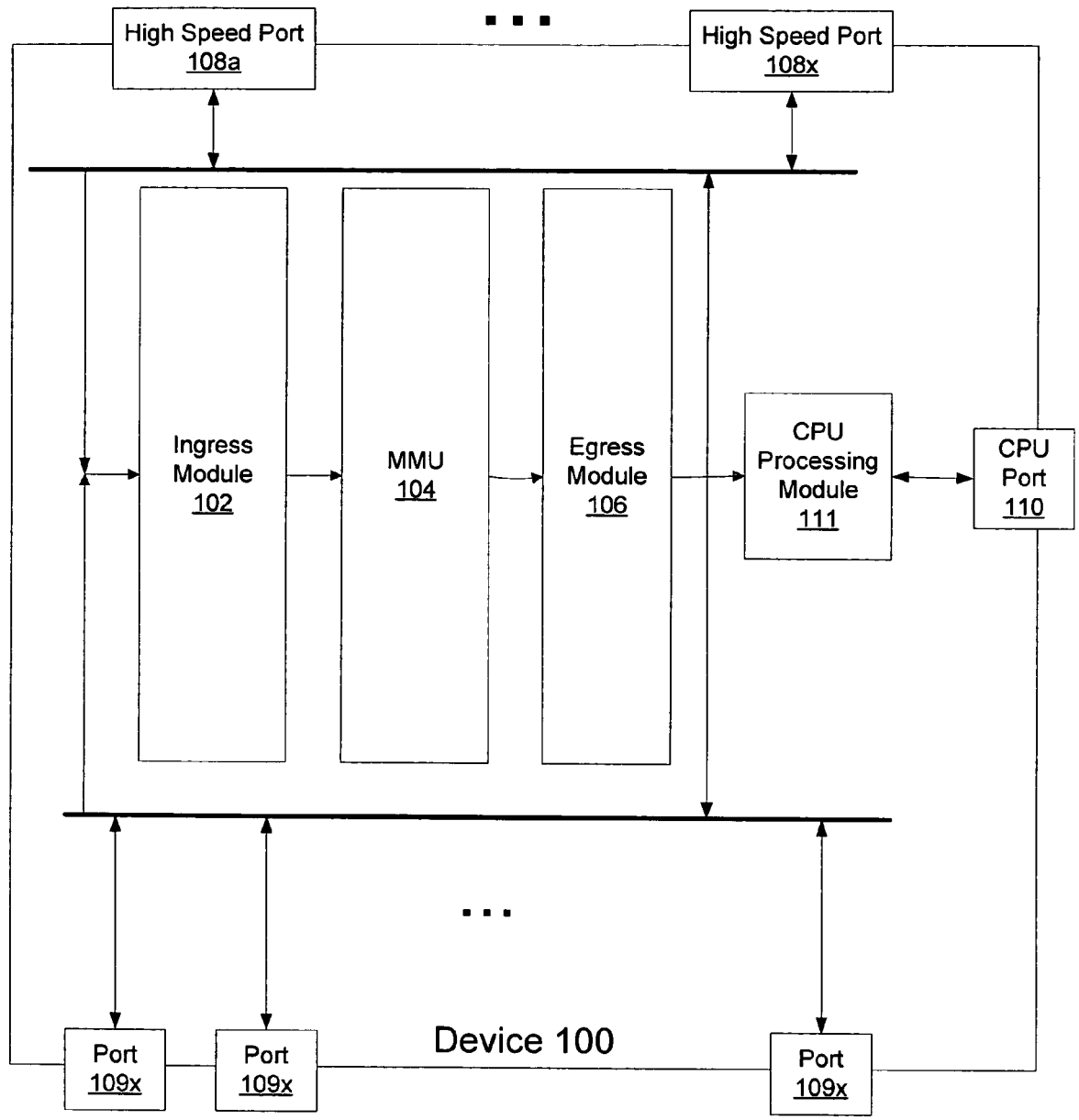
FIG. 1 illustrates a network device in which an embodiment of the present invention may be implemented.

FIG. 1 illustrates a network device, such as a switching chip, in which an embodiment the present invention may be implemented. Device 100 includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 includes multiple cycles for processing instructions generated by that module. Device 100 implements a pipelined approach to process incoming packets. The device 100 has the ability of the pipeline to process, according to one embodiment, one packet every clock cycle. According to one embodiment of the invention, the device 100 includes a 133.33 MHz core clock. This means that the device 100 architecture is capable of processing 133.33M packets/sec.

Device 100 may also include one or more internal fabric high speed ports, for example a HiGig™, high speed port 108a-108x, one or more external Ethernet ports 109a-109x, and a CPU port 110. High speed ports 108a-108x are used to interconnect various network devices in a system and thus form an internal switching fabric for transporting packets between external source ports and one or more external destination ports. As such, high speed ports 108a-108x are not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 199a-109x. Specifically, traffic in device 100 is routed from an external Ethernet source port to one or more unique destination Ethernet ports 109a-109x. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global a trunk group identifier (TGID). According to an embodiment, device 100 can support up to 128 trunk ports, with up to 8 members per trunk port, and up to 29 external physical ports. Destination ports 109a-109x on device 100 may be physical external Ethernet ports or trunk ports. If a destination port is a trunk port, device 100 dynamically selects a physical external Ethernet port in the trunk by using a hash to select a member port. As explained in more detail below, the dynamic selection enables device 100 to allow for dynamic load sharing between ports in a trunk.

Once a packet enters device 100 on a source port 109a-109x, the packet is transmitted to ingress module 102 for processing. Packets may enter device 100 from a XBOD or a GBOD. In an embodiment, the XBOD is a block that has one 10GE/12G MAC and supports packets from high speed ports 108a-108x. The GBOD is a block that has 12 10/100/1G MAC and supports packets from ports 109a-109x.

Figure 2:
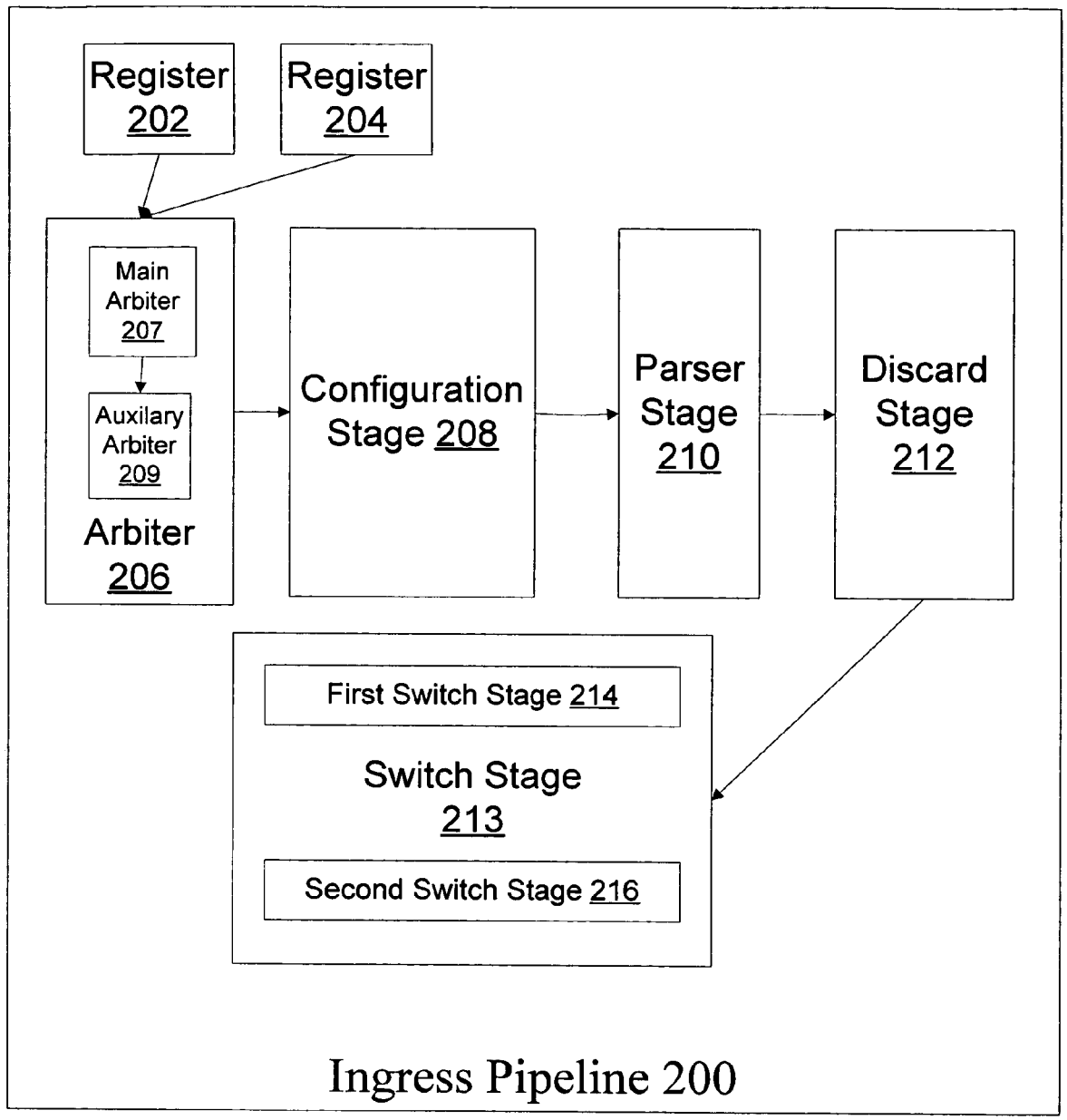
FIG. 2 illustrates a centralized ingress pipeline architecture, according to one embodiment of the present invention.

FIG. 2 illustrates a centralized ingress pipeline architecture 200 of ingress module 102. Ingress pipeline 200 processes incoming packets, primarily determines an egress bitmap and, in some cases, figures out which parts of the packet may be modified. Ingress pipeline 200 includes a data holding register 202, a module header holding register 204, an arbiter 206, a configuration stage 208, a parser stage 210, a discard stage 212 and a switch stage 213. Ingress pipeline 200 receives data from the XBOD, GBOD or CPU processing module 111 and stores cell data in data holding register 202. Arbiter 206 is responsible for scheduling requests from the GBOD, the XBOD and CPU. Configuration stage 208 is used for setting up a table with all major port-specific fields that are required for switching. Parser stage 210 parses the incoming packet and a high speed module header, if present, handles tunnelled packets through Layer 3 (L3) tunnel table lookups, generates user defined fields, verifies Internet Protocol version 4 (IPv4) checksum on outer IPv4 header, performs address checks and prepares relevant fields for downstream lookup processing. Discard stage 212 looks for various early discard conditions and either drops the packet and/or prevents it from being sent through pipeline 200. Switching stage 213 performs all switch processing in ingress pipeline 200, including address resolution.

According to one embodiment of the invention, the ingress pipeline includes an enable bit that enables statistical flow monitoring at the ingress module. The ingress module also includes a 16 bit threshold for the ingress port. Ingress module 102 also includes a seed for the ingress module to randomly generate a number. At each ingress port 109a-109i, ingress module 102 generates a random ingress statistical flow value and a random egress statistical flow value. Ingress module then converts the ingress threshold and an egress threshold to 24 bit values. Then ingress module 102 determines if the ingress enable bit is set and if the ingress threshold is less than or equal to the generated random ingress statistical flow value. If it is, a copy of the packet is sent to the CPU and a CPU operation code is set to the value of a statistical flow source which indicates that the packet is received at the CPU because of ingress sampling. Upon processing the packet, ingress module 102 transmits the packet data to MMU 104 which further transmits the packet to egress module 106.

Upon receiving the packet from MMU 104, egress module 106 supports multiple egress functions for a 72 gigabyte port bandwidth and a CPU processing bandwidth. According to an embodiment, egress module 106 is capable of handling more than 72 Gig of traffic, i.e., 24 one GE port, 4 high speed ports (12G) and a CPU processing port of 0.2GE. Egress module 106 receives original packets, as inputted from Ethernet ports 109a-109i, from MMU 104, and may either transmit modified or unmodified packets to destination ports 109j-109x. According to one embodiment of the invention, all packet modifications with device 100 are made in egress module 106 and the core processing of egress module 106 is capable of running faster than the processing of destination ports 109j-109x. Therefore, egress module 106 provides a stall mechanism on a port basis to prevent ports 109j-109x from becoming overloaded and thus services each port based on the speed of the port.

In an embodiment of the invention, egress module 106 is connected to MMU 104 by a 1024 bits data interface and all packets transmitted from MMU 104 passes through egress module 106. Specifically, MMU 104 passes unmodified packet data and control information to egress module 106. The control information includes the results of table lookups and switching decisions made in ingress module 102. In an embodiment of the invention, the data bus from MMU 106 is shared across all ports 108 and 109 and the CPU processing 111. As such, the bus uses a "request based" TDM scheme, wherein each Gig port has a turn on the bus every 72 cycles and each high speed Port 108 has a turn every 6 cycles. CPU processing packet data is transmitted over bubbles—free spaces occurring on the bus. Upon receiving the information for MMU 104, egress module 106 parses the packet data, performs table lookups, executes switch logic, modifies, aligns and further buffers the packet before the data is transmitted to the appropriate destination port 109i-109j.

Egress module 106 is connected to CPU processing module 111 through a 32 bit S-bus interface which the CPU uses to send requests to egress module 106. The requests are typically for reading the egress module's resources, i.e., registers, memories and/or stat counters. Upon receiving a request, egress module 106 converts the request into a command and uses a mechanism, described in detail below, for storing and inserting CPU instructions into a pipeline wherever there is an available slot on the pipeline. The CPU request may include a field that defines the priority for the copy of the packet going to the CPU for statistically flow reasons.

According to one embodiment of the invention, the egress pipeline also includes an enable bit that enables statistical flow monitoring at egress module 106. The egress module 106 also includes a 16 bit threshold for the egress port and a seed for egress module 106 to randomly generate a number. At each egress port 109a-109i, egress module 106 determines if the egress enable bit is set and if the egress threshold is less than or equal to the generated random egress statistical flow value. If it is, a copy of the packet is sent to the CPU and a CPU operation code is set to the value of a statistical flow destination which indicates that the packet is received at the CPU because of egress sampling. It should be noted that packets may be copied to the CPU for multiple reasons. However, only one copy of the packet is sent with all the reason operation codes set. The priority of the packet copy going to the CPU is the maximum priority. Nevertheless, the packets copied to the CPU are subject to Head Of Line drops and drops because the MMU buffer is full. The granularity of the threshold increase is 512 and the packet sampling rages are from 0.0015 percent to 99.98 percent.

Figure 3:
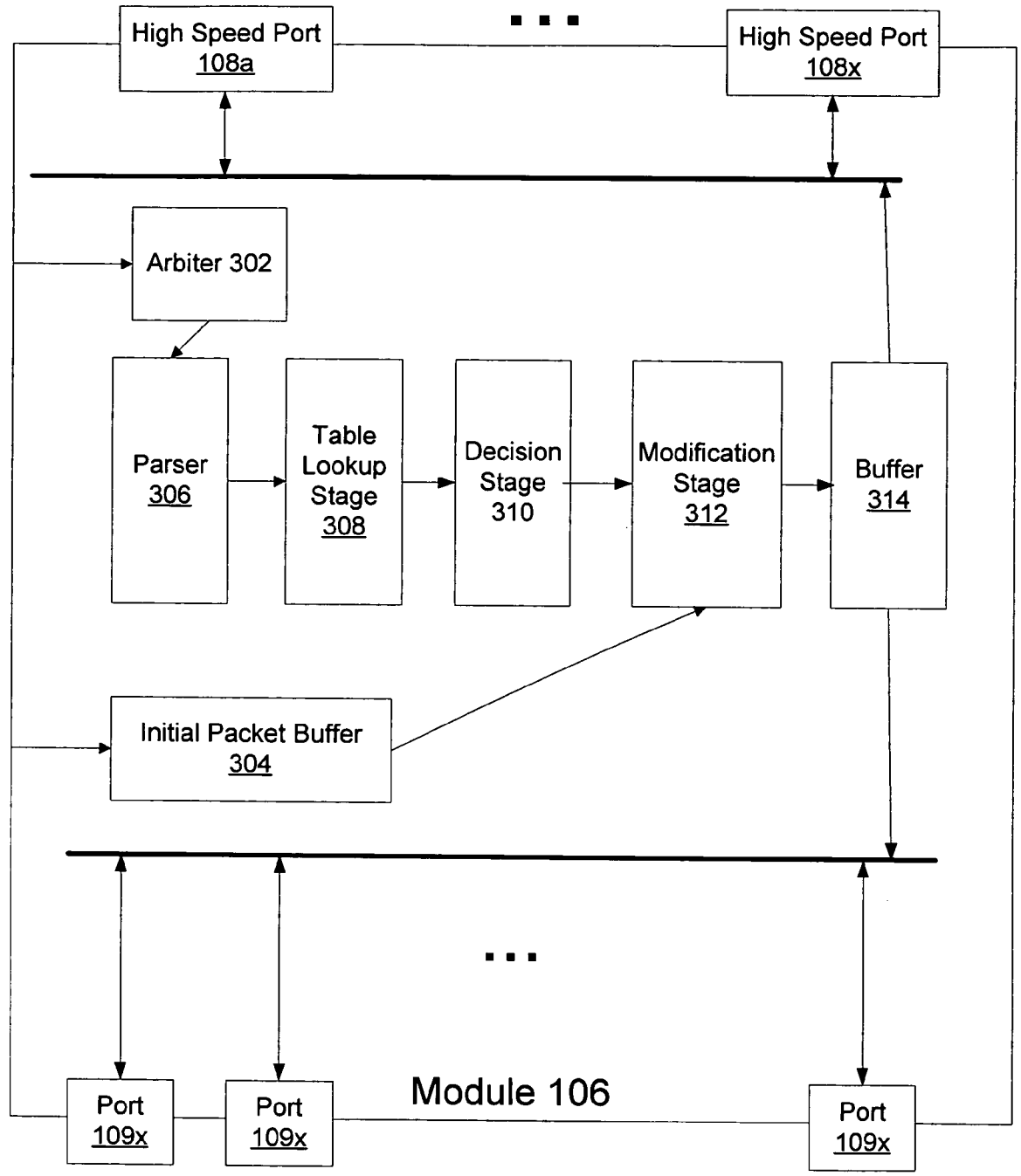
FIG. 3 illustrates a centralized egress pipeline architecture of an egress stage.

FIG. 3 illustrates a centralized egress pipeline architecture 300 of egress stage 106. Egress pipeline 300 includes an arbiter 302, parser 306, a table lookup stage 308, a decision stage 310, a modification stage 312 and a data buffer 314. Arbiter 302 provides arbitration for accessing egress pipeline 300 resources between packet data and control information from MMU and information from the CPU. Parser 306 performs packet parsing for table lookups and modifications. Table lookup stage 308 performs table lookups for information transmitted from parser 306. Decision stage 310 is used for deciding whether to modify, drop or otherwise process the packet. Modification stage 312 makes modification to the packet data based on outputs from previous stages of the ingress module.

All incoming packet data from MMU 104 is transmitted to an initial packet buffer 304. In an embodiment of the invention, the initial packet buffer is 1044 bits wide and 18 words deep. Egress pipeline 300 receives two inputs, packet data and control information from MMU 104 and CPU operations from the s-bus. Initial packet buffer 304 stores packet data and keeps track of any empty cycles coming from MMU 104. Initial packet buffer 304 outputs its write address and parser 306 passes the latest write address with pipeline instructions to modification stage 314.

Arbiter 302 collects packet data and control information from MMU 104 and read/write requests to registers and memories from the CPU and synchronizes the packet data and control information from MMU 104 and writes the requests from the CPU in a holding register. Based on the request type from the CPU, arbiter 302 generates pipeline register and memory access instructions and hardware table initialization instructions. After arbiter 302 collects packet data, CPU requests and hardware table initialization messages, it generates an appropriate instruction. According to an embodiment, arbiter 302 generates a Start Cell Packet instruction, an End Cell of Packet instruction, a Middle Cell of Packet instruction, a Start-End Cell of Packet instruction, a Register Read Operation instruction, a Register Write Operation instruction, Memory Read Operation instruction, a Memory Write Operation instruction, a Memory Reset Write Operation instruction, a Memory Reset Write All Operation instruction and a No Operation instruction. Egress pipeline 300 resources associated Start Cell Packet instructions and Start-End Cell of Packet instructions are given the highest priority by arbiter 304. End Cell of Packet instructions, Middle Cell of Packet instructions, Register Read Operation instructions, Register Write Operation instructions, Memory Read Operation instructions and Memory Write Operation instruction receive the second highest priority from arbiter 304. Memory Reset Write Operation instructions and Memory Reset Write All Operation instructions receive the third highest priority from arbiter 304. No Operation instructions receive the lowest priority from arbiter 304.

After receiving an instruction from arbiter 304, parser 306 parses packet data associated with the Start Cell of Packet instruction and the Start-End Cell of Packet instruction using the control information and a configuration register transmitted from arbiter 306. According to an embodiment, the packet data is parsed to obtained L4 and L3 fields which appear in the first 148 bytes of the packet.

Table lookup stage 308 then receives all packet fields and register values from parser 306. Information from table lookup stage 306 is then transmitted to decision stage 310 where a decision is made as to whether to modify, drop or otherwise process the packet. For example, decision stage 310 first looks for flush bits at the beginning of the packet transmission and if the flush bits are set, the packets are marked "dropped". In an embodiment of the invention, if a flush bit for a packet is set for a packet already in transmission, the packet is completely transmitted and the next packet is flushed. In another example, MMU 104 may mark packets as Purge, Aged or Cell Error and decision stage 310 may either be dropped or transmit these packet but mark them as erroneous. In another example, if a VLAN translate feature is enabled, but there was a miss in a CAM lookup, the decision stage 310 may drop the packet if certain fields are set. Decision stage 308 also determines if the packet need to be L4 switched or L3 routed and the type of mirroring functions that need to be performed on the packet.

Modification stage 312 thereafter constructs a Tunnel IP Header and a module header for the packet, makes replacement changes in the packet and computes IP checksum for outer and inner IP headers. Modification stage 312 receives a packet data interface from the initial buffer 304 which enables modification stage 301 to provide a read address to initial buffer 304 and in response obtain the packet data and basic control data. Modification stage 312 then generates Middle of Packet and End of Packet instructions based on the data received from initial buffer 304 and makes changes based on these commands. Modification stage 312 also receives all packet decisions and pipeline commands decision stage 310 and uses this information to make further changes to the packet. Specifically, all fields of the tunnel IP header which need to be filled by incoming packet fields are filled. Furthermore, IP checksum for tunnel IP header is computed in parallel with the header construction. Modification stage 312 further reads back packets and control information from initial buffer 304 and performs all packet modifications and replacements of fields. It outputs CPU operations and hardware commands and data and addresses associated with them on one bus and outputs packet data and control information on another bus. Additionally, modification stage 312 performs physical encapsulation and de-capsulation of headers and tag removal and insertions. If a packet is going to a high speed port, modification stage 312 converts the packet from Ethernet format to high speed format. Modification stage 312 also aligns the packet by padding packets smaller than 64 bytes and removes holes by aligning data to 1314 bit boundary. Thereafter, 1314 bits "complete" data word is outputted from modification stage 312 to the data buffer 314.

Data buffer 314 stores completed data words from modification stage 312 in memory. Before the egress pipeline sends packets out to destination ports 109j-109x, the packet data are stored in the data buffer 314 for pipeline latency and port speed matching. Data buffer 314 is capable for requesting data from MMU 104 whenever it has a free space.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

With respect to the present invention, network devices may be any device that utilizes network data, and can include switches, routers, bridges, gateways or servers. In addition, while the above discussion specifically mentions the handling of packets, packets, in the context of the instant application, can include any sort of data-grams, data packets and cells, or any type of data exchanged between network devices.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for providing statistical sampling of packets at ports, the network device comprising:
   an ingress module configured to randomly select a packet at one of a plurality of ingress ports for statistical sampling;

a memory management unit configured to store packets received from the ingress module;

an egress module configured to receive the stored packets from the memory management unit and to randomly select a packet at one of a plurality of egress ports for statistical sampling; and a processing module configured to receive a copy of a selected packet from at least one of the ingress module or egress module, make a determination whether the copy of the selected packet was received from the ingress module or the egress module, and perform statistical flow processing on the packet, based on the determination, wherein if the copy of the packet is received by the processing module from the ingress module, a CPU operation code is set to a source value to indicate that the received copy of the packet is due to ingress sampling by the ingress module, and wherein if the copy of the packet is received from the egress module, a CPU operation code is set to a destination value to indicate that the received copy of the packet is due to egress sampling by the egress module.

2. The network device according to claim 1, wherein the ingress module is configured to generate a random ingress value and a random egress value at each of the plurality of ingress and egress ports.

3. The network device according to claim 2, wherein the ingress module is further configured to generate an ingress threshold value.

4. The network device according to claim 3, wherein for each of the plurality of ingress ports the ingress module is configured to copy a packet to the processing module and set the CPU operation code to the source value if an enable bit is set and if the ingress threshold value is less than or equal to a random ingress value.

5. The network device according to claim 4, wherein the processing module is configured to interpret the source value as indicating that a received packet is a result of ingress sampling.

6. The network device according to claim 2, wherein the egress module is configured to generate an egress threshold value.

7. The network device according to claim 6, wherein for each of the plurality of egress ports the egress module is configured to copy a packet to the processing module and set the CPU operation code to the destination value if an enable bit is set and if the egress threshold value is less than or equal to a random egress value.

8. The network device according to claim 7, wherein the processing module is configured to interpret the destination value as indicating that a received packet is a result of egress sampling.

9. The network device according to claim 1, wherein the network device is configured to set a priority of a copy of a packet to the processing module relative to other packets received at the processing module.

10. The network device according to claim 1, wherein the processing module is configured to drop a copy of a packet if a predefined condition is met.

11. The network device according to claim 1, wherein the network device is configured to set variable sampling rates at each of the ingress module and egress module.

12. A method for providing statistical sampling of a plurality of packets at a plurality of ports, the method comprising:

randomly selecting a packet at one of a plurality of ingress ports of an ingress module for statistical sampling;

randomly selecting a packet at one of a plurality of egress ports of an egress module for statistical sampling; and receiving a copy of a selected packet, at a processing module, from at least one of the ingress module or egress module and performing statistical flow processing on the packet, based on whether the copy of the selected packet was received from the ingress module or the egress module;

wherein the randomly selecting a packet at one of a plurality of ingress ports of an ingress module for statistical sampling includes, if the copy of the packet is received by the processing module from the ingress module, setting a CPU operation code a source value to indicate that the received copy of the packet is due to ingress sampling; and wherein the randomly selecting a packet at one of a plurality of egress ports of an egress module for statistical sampling includes, if the copy of the packet is received from the egress module, setting a CPU operation code to a destination value to indicate that the received copy of the packet is due to egress sampling.

13. The method according to claim 12, wherein randomly selecting a packet at one of a plurality of ports of an ingress module comprises generating a random ingress value and a random egress value at each of the plurality of ingress ports.

14. The method according to claim 13, wherein randomly selecting a packet at one of a plurality of ingress ports of an ingress module comprises copying a packet to the processing module and setting the CPU operation code to a source value if an enable bit is set and if the ingress threshold value is less than or equal to random ingress value.

15. The method according to claim 12, wherein randomly selecting a packet at one of a plurality of egress ports of an egress module comprises generating an egress threshold value.

16. The method according to claim 12, wherein randomly selecting a packet at one of a plurality of egress ports of an egress module comprises copying a packet to the processing module and setting the CPU operation code to a destination value if an enable bit is set and if the egress threshold value is less than or equal to a random egress value.

17. A network device for providing statistical sampling of packets at ports, the network device comprising:

an ingress module configured to randomly select a packet at one of a plurality of ingress ports for statistical sampling;

a memory management unit configured to store packets received from the ingress module;

an egress module configured to receive the stored packets from the memory management unit and to randomly select a packet at one of a plurality of egress ports for statistical sampling; and a processing module configured to receive a copy of a selected packet from at least one of the ingress module or egress module, make a determination whether the copy of the selected packet was received from the ingress module or the egress module based on a CPU operation code, and perform statistical flow processing on the packet, wherein the CPU operation code is set to a source value to indicate ingress sampling by the ingress module and set to a destination value to indicate egress sampling by the egress module.

* * * * *

UNITED STATES PATENT AND TRADEMARK OFFICE
CERTIFICATE OF CORRECTION

| | | |
|---|---|---|
| PATENT NO. | : 8,085,766 B2 | Page 1 of 1 |
| APPLICATION NO. | : 11/480844 | |
| DATED | : December 27, 2011 | |
| INVENTOR(S) | : Mohan Kalkunte et al. | |

It is certified that error appears in the above-identified patent and that said Letters Patent is hereby corrected as shown below:

On the title page, field (56), under "OTHER PUBLICATIONS", in column 2, line 2, delete "Corportation's" and insert -- Corporation's --, therefor Signed and Sealed this
Fourteenth Day of February, 2012

David J. Kappos
*Director of the United States Patent and Trademark Office*